United States Patent
Stephan et al.

(10) Patent No.: US 9,737,911 B2
(45) Date of Patent: Aug. 22, 2017

(54) METHOD FOR OPERATING MACHINES HAVING MOVING PARTS AND ARRANGED JOINTLY ON A SUPPORT

(71) Applicant: BASF SE, Ludwigshafen (DE)

(72) Inventors: Oskar Stephan, Hockenheim (DE); Thomas Rosenberger, Lautersheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/893,411

(22) PCT Filed: May 22, 2014

(86) PCT No.: PCT/EP2014/060520
§ 371 (c)(1),
(2) Date: Nov. 23, 2015

(87) PCT Pub. No.: WO2014/187891
PCT Pub. Date: Nov. 27, 2014

(65) Prior Publication Data
US 2016/0121369 A1    May 5, 2016

(30) Foreign Application Priority Data
May 24, 2013  (EP) .................................. 13169177

(51) Int. Cl.
*B07B 1/42*   (2006.01)
*B07B 11/04*  (2006.01)
*F16F 15/00*  (2006.01)

(52) U.S. Cl.
CPC ............ *B07B 11/04* (2013.01); *F16F 15/002* (2013.01)

(58) Field of Classification Search
CPC ............ B07B 1/28; B07B 1/286; B07B 1/288
USPC ....... 209/326, 364, 309, 365.1, 365.4, 366.5
See application file for complete search history.

(56) References Cited

U.S. PATENT DOCUMENTS 2,538,760 A * 1/1951 Brown et al. ................... 310/19
2,965,233 A * 12/1960 Muller .................... B07B 1/286
                                                        209/326
3,633,745 A * 1/1972 Wehner .................. B07B 1/485
                                                        209/310

(Continued)

FOREIGN PATENT DOCUMENTS

DE   199 00 905 C1    9/2000
EP   0 834 984 A2     4/1998
EP      0834984 A2 *  4/1998  .......... H02M 7/5395

OTHER PUBLICATIONS

International Search Report in International Patent Application No. PCT/EP2014/060520, dated Dec. 3, 2014 (English translation).

*Primary Examiner* — Terrell Matthews
(74) *Attorney, Agent, or Firm* — Marshall, Gerstein & Borun LLP

(57) ABSTRACT

A method is described for operating machines (10) having moving parts and arranged jointly on a support (32), said parts being moved periodically with substantially the same frequency, and wherein the phase of an oscillation of one machine (10) in relation to the phase of an oscillation of a further machine (10) is controlled by shifting the phases with respect to one another such that the amplitude of an oscillation of a structural part, for example of the support (32), remains below a predefined maximum value.

13 Claims, 2 Drawing Sheets

(56) References Cited

U.S. PATENT DOCUMENTS

| | | | | |
|---|---|---|---|---|
| 4,927,534 | A * | 5/1990 | Riihimaki | B07B 1/46 209/255 |
| 5,221,185 | A * | 6/1993 | Pla | B64C 11/50 244/1 N |
| 5,261,540 | A * | 11/1993 | Sijsling | B07B 1/42 209/368 |
| 5,301,814 | A * | 4/1994 | Lower | B07B 1/38 198/770 |
| 5,789,678 | A * | 8/1998 | Pla | B64C 11/50 244/1 N |
| 5,791,494 | A * | 8/1998 | Meyer | B07B 1/42 209/365.3 |
| 6,135,682 | A * | 10/2000 | McCalmont | G05B 19/195 409/131 |
| 7,025,210 | B2 * | 4/2006 | Mooney | B07B 1/00 209/309 |
| 8,561,803 | B2 * | 10/2013 | Fallon | B07B 1/28 209/365.4 |
| 8,561,805 | B2 * | 10/2013 | Scott | B01D 33/0315 209/555 |

* cited by examiner

METHOD FOR OPERATING MACHINES HAVING MOVING PARTS AND ARRANGED JOINTLY ON A SUPPORT

CROSS-REFERENCE TO RELATED APPLICATION

This is the U.S. national phase of International Application No. PCT/EP2014/060520, filed May 22, 2014, which claims the benefit of European Patent application No. 13169177.6, filed May 24, 2013.

The invention relates to a method for operating machines having moving parts and arranged jointly on a support, said parts being moved periodically with substantially the same frequency.

One example of such a machine is a tumbler screening machine. A tumbler screening machine comprises a screen structure having one or more screens, which are arranged one above another. A screen of the screen structure is also called a screen deck here, typical tumbler screening machines having between one and six screen decks. The material to be screened is put onto the screen structure from above and runs through the latter, the remaining material fraction becoming finer with each screen deck that is run through and the coarse fractions being separated off gradually. The movement of the material through the screen structure is assisted by the movement of the screen structure. In tumbler screening machines, the screen structure is mounted on a frame for this purpose and set moving via a motor. Here, the screen structure is arranged on the frame such that the latter is connected via an eccentric to a rotary shaft driven by the motor. By means of the eccentric, an offset is produced between the rotary shaft and the axis of symmetry of the screen structure. In addition, the frame can be designed such that the screen structure is allowed to tilt in relation to the axis of rotation. The screen structure is forced to make a tumbling movement as a result of this arrangement when the rotary shaft is driven. The movement is periodic, one period corresponding to the time interval of one revolution of the rotary shaft. The material to be screened executes an elliptical movement, starting from the center of the screen structure, at which the material is put in. The residence time of the material in the screen structure can be adjusted by displacing the eccentric and the angle of inclination of the screen structure.

Tumbler screening machines of this type are known, for example from DE199 00 905 C1. The tumbler screening machine described there comprises a base plate that can be rotated by a motor and a foot plate arranged thereon, of which the angle of inclination can be adjusted. The foot plate can be displaced with respect to the base plate via further displacement means. Arranged on the foot plate is an offset pin, which is rotatably connected to a screen structure which is held by a supporting device and which, during the rotation of the base plate, executes a tumbling movement or an oscillating and throwing movement.

As a result of the tumbling movement of the screening machines, oscillations are produced, which are transmitted to the floor and therefore to the building in which the machines are erected. These oscillations can load the building highly and lead to cracks or other damage to the structure. This is problematic, in particular when the machines cannot be erected on the ground floor of the building, since the oscillations of the building become greater with increasing height. It is therefore necessary to minimize the oscillations of the floor and of the building caused by the screening machines.

By means of providing counterweights, attempts are firstly made to reduce the amplitude of the intensity of the oscillations of the machines. Secondly, the machines are frequently arranged on a damped plinth, which is intended to reduce the transmission of the oscillations of the machines to the floor and to the building. However, complete suppression of the oscillations is not possible.

If only a single machine is arranged in a building or in part of a building, it is easily possible to draw conclusions about the loading of the building that is to be expected by means of a measurement of the movement or the oscillation of this machine. The amplitude of an oscillation of a part of a building will always be smaller than the oscillation of the machine if the frequency of the movement of the machine is chosen such that this does not correspond to any resonant frequency or natural frequency of the building. The frequency of a periodic movement corresponds to the reciprocal of the period of the movement. If a resonant frequency of the building were to be chosen as the frequency of the movement of the machine, then the amplitude of the oscillation of the building would be reinforced, possibly even beyond the amplitude of the oscillation of the machine, as a result of which considerable damage to the building could arise. Therefore, the intended frequency of movement of a machine is generally chosen such that this does not correspond to any resonant frequency or natural frequency of the building.

If multiple machines are arranged in a building or in a part of the building, the oscillations generated are superposed. The maximum amplitude of the superposed oscillation here is equal to the sum of the maximum amplitude of the individual oscillations. The actual amplitude of the superposed oscillation depends not only on the amplitudes of the individual oscillations but also on the frequencies and phases thereof relative to one another. If, for example, two identical machines are operated with the same frequency, so that these generate oscillations of equal frequency and amplitude, the intensity of the oscillation of the building will depend on whether the movements of the machines are in phase or in anti-phase. If the movements of the machines are in phase, which means that the phase difference is 0 or an integer multiple of $2\pi$ in radians, then the amplitude of the resultant superposed oscillation is at a maximum and equal to the sum of the amplitudes of the individual oscillations. If, on the other hand, the movements of the machines are in anti-phase, which means that the phase difference is $\pi$ or $(2n+1)\pi$ in radians, where n is an integer, then the amplitude of the resultant oscillation is at a minimum and equal to the difference in the amplitudes of the individual oscillations.

Since, as a rule, the movements of the machines are controlled and driven independently of one another, the phase of the movements is in principle random, so that, in particular in the case of a relatively large number of machines, it would have to be assumed that the superposed oscillation acting on the building would lie below the theoretically maximum possible amplitude.

However, as a result, firstly a random in-phase movement of two or more machines is not ruled out, secondly the movements of the machines could be synchronized by means of weak coupling of the machines via the common floor. This effect is known as the synchronization of weakly coupled oscillators.

Furthermore, the phase of a movement of a machine can be shifted as a result of a fluctuating working load. For example, the phase of the movement of a tumbler screening machine can be shifted by the introduction of material to be screened.

It is accordingly an object of the invention to provide a method for operating multiple machines having periodically moved parts and arranged jointly on a support, with which the amplitude of an oscillation superposed on part of a building by the machines can be reduced.

The object is achieved by a method for operating machines having moving parts and arranged jointly on a support, said parts being moved periodically with substantially the same frequency, wherein the phase of an oscillation of one machine in relation to the phase of an oscillation of a further machine is controlled by shifting the phases with respect to one another such that the amplitude of an oscillation of a structural part remains below a predefined maximum value.

Structural parts are understood to be both the individual parts of the building in which the machines are arranged and also stands, frames and mountings in which the machines can be accommodated. The support on which the machines are jointly arranged is likewise a structural part and can be part of a building, stand, frame or a mounting.

The predefined maximum value for the oscillation of a structural part is determined by calculation or trials such that damage to the structure can be avoided. In the case of a building as a structure, the predefined maximum value is chosen such that, for example, the production of cracks in walls or floors can be reliably avoided. Furthermore, in one embodiment, it is conceivable to control the phases such that the oscillation of one or more structural parts is minimized.

In one embodiment of the method, the structural part of which the oscillation is intended to remain below the predefined maximum value is the support on which the machines are arranged. The support can be in particular a floor of a building or part of a stand, a frame or a mounting.

In the case of a floor of a building as a support, in particular when the machines are not arranged in the lowest storey of a building, said support can execute severe oscillations, i.e. oscillations with a large amplitude, which can lead to the occurrence of cracks. Furthermore, the floor can transmit the oscillations to further parts of the building, other structural parts or other equipment in the building, so that limiting the oscillations of the floor is also advantageous for these reasons.

In a further embodiment of the method, the machines are arranged on the support in an oscillation-damped manner.

The oscillation-damped arrangement of the machines, in addition to the control of the phases, constitutes a further possible way of reducing the oscillations which are transmitted to the building by the machines. On account of the generally high weight of the machines, it is preferred here to arrange each machine on a foundation of its own. A suitable foundation comprises, for example, multiple steel plates cast in concrete, a damping plate being inserted between the foundation and the machine. Optionally, a load distribution plate is further inserted between the damping plate and the machine, in order not to load the damping plate with the weight of the machine at a point but distributed over a large area. The damping plate preferably consists of a resilient material, the properties such as thickness and hardness of the material being chosen such that the oscillation damping becomes a maximum. For example, a finite-element simulation of the oscillating system can be used as a basis for this choice.

In one embodiment of the invention, the phase is controlled by shifting the phase of the oscillation of the machine in relation to a further machine, the phase of the movement of a machine being shifted by temporarily increasing or reducing the frequency of the movement of the machine.

A phase difference of the oscillation of a machine in relation to a further machine can be expressed via a phase angle; in the case of an angular difference of $\pi$ radians the oscillations being exactly opposite and, in the case of an angular difference of 0 the movements being synchronous. If, for example, the two machines execute a circular movement, the oscillation being caused by an imbalance of the machine, in the case of an angular difference of 0 (0°), the imbalances point in the same direction and, in the case of an angular difference of $\pi$ (180°), the imbalances point in opposite directions. The angular difference can be changed by briefly raising or lowering the frequency of movement of one of the machines. In the case of a slight increase, for example, the imbalance of one machine then rotates more quickly than that of the other machine, the difference in the phase angle changing accordingly. Assuming that, at the start of the increase in frequency, the angular difference was 0, the movement of the one machine then increasingly leads that of the other. If, after reaching the desired angular difference, for example $\pi$, so that the movements are opposed, the speed or frequency is equalized again, this difference is maintained under the condition that the frequencies of movement are exactly equal.

Preferably, for the control of the phase, the frequency of movement of a machine is varied only slightly, in order to keep the process parameters with which the machines operate as stable as possible.

In one embodiment of the invention, the machines are operated via an electric drive, which is driven via a frequency converter. A change in the frequency of the movement of a machine can then be made by controlling the frequency of the converter. Further control components within the machine are not required in this embodiment.

In one embodiment of the invention, the amplitude and/or the phase of the oscillation of a structural part and/or the machines is measured and taken into account when controlling the phases of the oscillations of the machines in relation to each other.

For instance, rotational speed sensors, with which the current frequency of the movement can be determined, can be arranged in the machines. For instance, the rotational speed sensor is implemented as a key phasor, in which a marking on the axis of rotation is monitored and a pulse is output during each revolution. By using this, in principle the phase of the movement of the machine can also be determined, since the pulse is always output by the sensor with the same orientation of the axis of rotation. However, this phase does not necessarily coincide with the phase of the oscillation generated by the machine and transmitted to the support. The phase of the oscillation, for example in the case of a circular movement, depends on the position of the imbalance and changes in the event of a displacement of the imbalance. The measurement of the rotational speed is preferably used to determine or monitor the frequency of movement of the machines.

Furthermore, in the area of the machines or at other points on the support or on a structural part, acceleration sensors can be arranged, from the signal of which the amplitude of the oscillation and its variation over time can be derived. From the variation over time, for example by determining the maxima and minima, it is in turn possible to draw conclusions about the phase. In particular, the acceleration sensors can be arranged on the floor of the building in order to measure the oscillation of the latter.

In one embodiment of the method, the amplitude of the oscillation of the support is measured and, if a predefined limiting value is exceeded, which lies below the maximum value predefined for the oscillation of the structural part, the phase of the movement of a machine is changed.

The limiting value is predefined such that, even if exceeded slightly, a damaging effect of the oscillations can still reliably be ruled out, and lies below the predefined maximum value. If it is established that this limiting value has been exceeded, since for example two machines transmit oscillations with the same phase to the support or to another structural part, the phase of the movement of a machine is changed. To this end, the frequency of the movement of one of the machines is raised or lowered slightly. If the measured amplitude of the oscillation of the support falls below the limiting value again, the frequency of movement is set to the original value again and kept stable. As a result of changing the frequency of movement, the phase of the movement of the machines in relation to one another and also the position of the imbalance of the one machine in relation to the other machine is changed.

This embodiment of the method is advantageous in particular when the position of the imbalance in the machine can change since, for the control, the accurate position of the imbalance neither has to be known nor constant. The position of the imbalance can be changed, for example, by the introduction of materials to be treated into the machines.

In a further embodiment of the method, a phase set point is predefined for each machine and the phase of the oscillation of a machine is controlled to the phase set point, the phase set point being chosen such that an oscillation of a structural part is minimized.

In this embodiment, it is advantageous if the position of an imbalance present in the respective machine is not displaced or displaced only slightly during operation, and thus the phase of the oscillation transmitted to the floor always has a fixed relationship to the phase of the movement of the machine.

The position of the imbalance must be determined for this form of the control. The position can be derived from measurements of the oscillations of the machine. If the phase determined deviates from the predefined phase set point, as already described, the frequency of movement of the machine involved is raised or lowered slightly. After the phase set point has been reached, the original frequency of movement is established once more.

In a further embodiment of the invention, in which the phase in two machines is controlled, the phase set point of the first machine is defined as 0 (or 0°), and the phase set point of the second machine is defined as $\pi$ (180°), minus the phase difference which results from the propagation time of the oscillation from the second machine to the first machine.

By taking into account the propagation times of the oscillation when predefining the phase difference, the phases of the individual oscillations can be set exactly opposite, despite the phase shift caused by the propagation time.

In a further embodiment of the method, the predefined phase set points are calculated numerically or analytically, the distance of the machines from one another, the arrangement of the machines in relation to one another, the oscillation damping of the machines, the damping of the floor, the resonant frequencies of structural parts and the machines, a frequency set point of the movement of the machines or of a combination of at least two of these parameters being taken into account.

For instance, a numerical method based on a finite-element simulation is suitable for the calculation.

In one embodiment of the method, the control of the movement of the machines is carried out while avoiding frequencies which correspond to a resonant frequency of a structural part or of a machine.

If a machine is to be operated with a frequency of movement which corresponds to a resonant frequency of a structural part or of a machine, oscillations can be transmitted to this part or to this machine with high amplitude. Therefore, firstly the set points of the frequencies of movement of the machines are predefined such that these do not correspond to a resonant frequency. Secondly, when increasing or reducing the frequency of movement, in order for example to change the phase, the set frequency is likewise chosen such that this does not correspond to a resonant frequency.

In one embodiment of the method, between 2 and 36 machines are operated simultaneously by using said method.

In one embodiment of the invention, the method is carried out with the aid of a programmable logic controller. This programmable logic controller (PLC) is connected to all the machines and sensors. Depending on the input values from the sensors, it is then possible for the PLC to decide whether and what type of control measure is required. Optionally, the PLC can also be implemented such that, in the event of a maximum value of an oscillation of a structural part been exceeded, one or more of the connected machines is/are also switched off.

In one embodiment of the invention, the machines operated with the method are oscillating and/or tumbling screening machines, and the movable parts are movable screens belonging to these machines.

In one embodiment of the method, polymers, for example polyacrylates, sand, gravel, tea or herbs or spices are processed with the screening machines.

The invention will be described in more detail below by using the drawings, in which.

Figure 1:
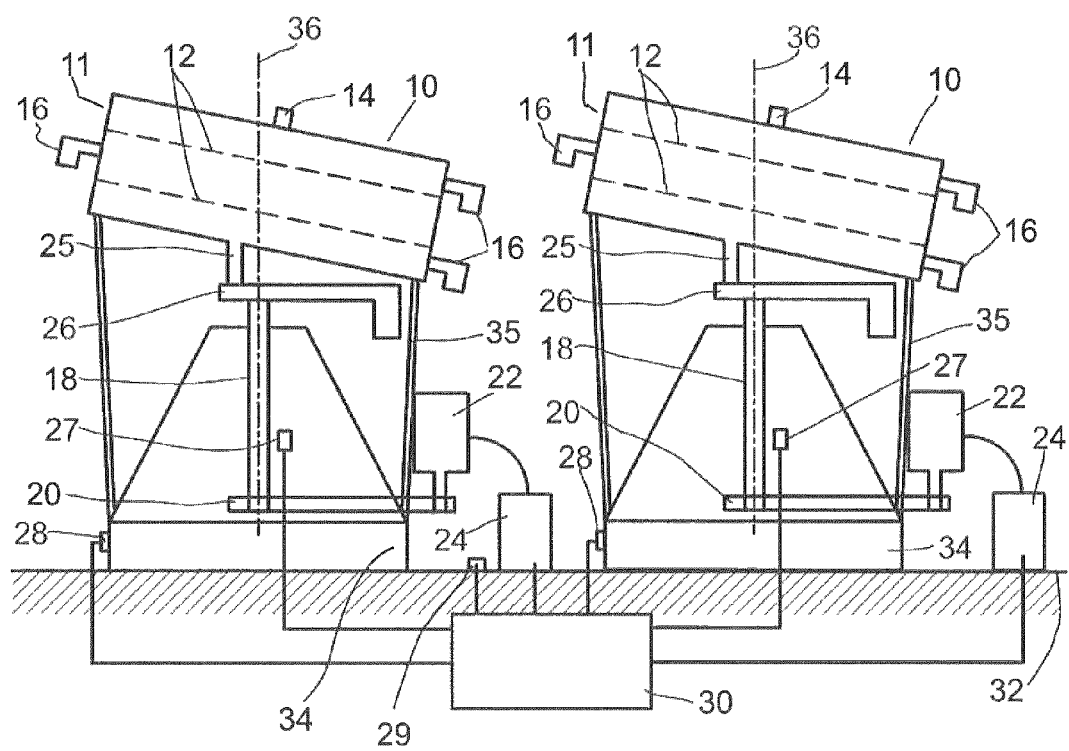
FIG. 1 shows two screening machines arranged jointly on a support.

In FIG. 1, two tumbler screening machines, which are arranged jointly on a support, are illustrated from the side.

FIG. 1 shows two tumbler screening machines 10 which are arranged jointly on a floor 32 as a support. Each of the tumbler screening machines 10 comprises a screen structure 11 which, in the embodiment illustrated in FIG. 1, comprises two screens 12. The screen structure 11 has a material feed 14 arranged above, via which material to be screened can be put in. The material passes through the screen structure 11 from top to bottom, in each case some of the material being separated off by the screens 12. The individual separated fractions can be removed via the three laterally arranged discharge points 16, the fractions becoming finer with each screen 12 that is passed through. The screen structure 11 is supported by mountings 35.

In order to assist the material transport, a tumbling movement can be imparted to the screen structure 11. To this end, the screen structure 11 is connected via a rotatable mounting 25 to an eccentric 26. The eccentric 26 can in turn be set rotating via a drive shaft 18. In the embodiment illustrated, a rotational speed sensor 27, which outputs one pulse to a control device 30 per revolution, is arranged on the drive shaft 18. The drive shaft 18 it connected via a belt 20 to an electric motor 22 and is driven by the latter. The electric motor 22 is activated via a frequency converter 24, the frequency converter 24 being connected to the control device 30.

The movement executed by the screen structure 11 is periodic, one period corresponding to the time interval of one revolution of the drive shaft 18. The material to be screened, which is fed onto the uppermost screen 12 at the material feed 14, executes an elliptical movement, starting from the center of the screen structure 11. The residence time of the material in the screen structure 11 can be set by displacing the eccentric 26, the angle of inclination of the screen structure 11 and the period or the frequency of the movement.

During the movement of the screen structure 11, oscillations are produced, since the screen structure can never be balanced completely, because of the material contained. These oscillations are transmitted to the floor 32 via the mountings 35 and the drive shaft 18. However, oscillation of the floor 32 is undesired, since the latter is subjected to high loadings as a result and the oscillations can possibly be transmitted to further structural parts such as other parts of the building or to other machines. For the purpose of damping, a damped foundation 34 is therefore arranged between the floor 32 and the tumbler screening machine 10.

Despite the damping by the damped foundation 34, some of the oscillations of the tumbler screening machine 10 are always transmitted to the floor 32. These oscillations of the floor 32 can be monitored via a sensor 29, which is likewise connected to the control device 30. In the control device 30, in addition a limiting value for the intensity or the amplitude of the oscillations of the floor 32 is stored; when said limiting value is exceeded, action is taken. Exceeding said limiting value in this way points to the fact that the individual oscillations of the two tumbler screening machines 10 are in phase and, as a result, the amplitude of the oscillation of the floor 32 is intensified.

If the predefined limiting value of the oscillations of the floor 32 is exceeded, one of the two frequency converters 24 is activated by the control device 30 in order to change the frequency with which the motor 22 is activated. For example, the frequency is increased for this purpose. As a result, the movement executed by the screen structure 11 of this tumbler screening machine 10 is accelerated. The rotation of the imbalance of this machine 10 is then faster than that of the other machine 10; the difference in the phase angles of the respective oscillations is changed accordingly. Assuming that, at the start of the increase in frequency, the angular difference of the two oscillations was 0, the movement of the one machine 10 increasingly leads that of the other. If, after the desired angular difference has been reached, for example π, so that the movements are opposed, the speed or frequency is equalized again, this difference is maintained under the conditions that the frequencies of movement are exactly equal. Following the action by the control device 30, the oscillations of the two tumbler screening machines are then in anti-phase and the amplitude of the overall oscillation is then considerably reduced and, under idealized conditions, would be 0.

In further embodiments, the control device 30 can also derive the phases of the oscillations of the respective machines 10 from the measured values from the acceleration sensors 28 arranged on the respective machines 10. Then, by means of briefly raising or lowering the frequency of movement, the control device 30 can set the phases of the oscillations such that the oscillation of the floor 32 is minimized. These optimal phases can, for example, be determined in advance via a finite-element simulation and likewise stored in the control device 30.

Figure 2:
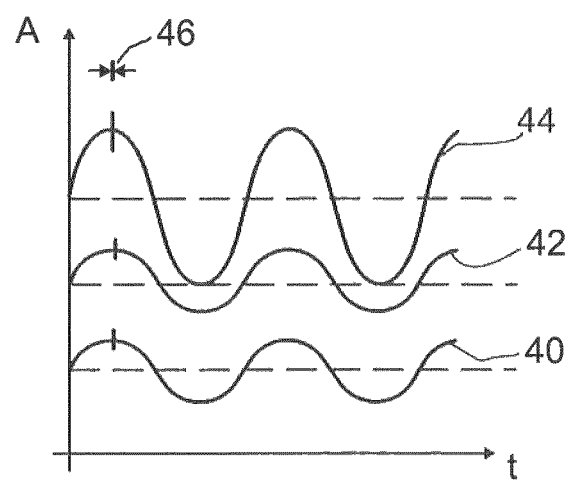
FIG. 2 shows amplitudes of two in-phase oscillations and the sum thereof.

In FIG. 2, the amplitudes of two in-phase oscillations and the sum thereof are illustrated.

FIG. 2 shows a graph in which the amplitude of an oscillation is plotted on the Y axis and the time is plotted on the X axis. The respective oscillations of two tumbler screening machines which, for example, have been measured on the foundations thereof, are plotted in the curves 40 and 42. Since the phase difference between the two oscillations is 0, the amplitudes are added and the overall oscillation 44 has an amplitude that is twice as high as the oscillation of one of the machines. For the purpose of better illustration, the respective curves are illustrated offset in relation to each other on the Y axis.

Figure 3:
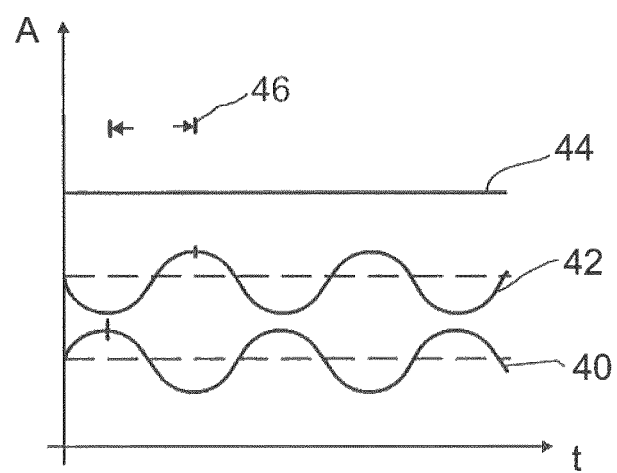
FIG. 3 shows amplitudes of two anti-phase oscillations and the sum.

In FIG. 3, the amplitudes of two anti-phase oscillations and the sum thereof are illustrated.

FIG. 3 shows a graph in which the amplitude of an oscillation is plotted on the Y axis and the time is plotted on the X axis. The respective oscillations of two tumbler screening machines which, for example, have been measured on the foundations thereof, are plotted in the curves 40 and 42. In the situation illustrated, the phase difference between the two oscillations is π, so that the oscillations are in anti-phase. In the overall oscillation 44, the two individual oscillations cancel each other out and the amplitude is constantly 0. For the purpose of better illustration, the respective curves are illustrated offset in relation to each other on the Y axis.

LIST OF DESIGNATIONS

10 Tumbler screening machine
11 Screen structure
12 Screen
14 Material feed
16 Discharge point
18 Drive shaft
20 Belt
22 Motor
24 Frequency converter
25 Rotatable mounting
26 Eccentric
27 Rotational speed sensor
28 Oscillation sensor (machine)
29 Oscillation sensor (floor)
30 Control device
32 Floor
34 Plinth
35 Mounting
36 Axis
40 Oscillation of first machine on its own
42 Oscillation of second machine on its own
44 Overall oscillation
46 Difference
A Amplitude
t Time

The invention claimed is:

1. A method for operating a first and a second oscillating and/or tumbling screening machine having moving screens and arranged jointly on a floor of a building, moving said screens periodically with the same set frequency, controlling a phase of an oscillation of one screening machine in relation to a phase of an oscillation of a further screening machine is controlled by shifting the phases with respect to one another such that an amplitude of an oscillation of a structural part remains below a predefined maximum value, wherein the structural part is the floor on which the screening machines are arranged.

2. The method as claimed in claim 1, wherein the machines are arranged on the floor in an oscillation-damped manner.

3. The method as claimed in claim 1, characterized in that the phase of the oscillation of a screening machine is controlled by temporarily raising or lowering the frequency of the movement of the screening machine.

4. The method as claimed in claim 3, wherein a change in the frequency of the movement of a screening machine is made by controlling a frequency converter.

5. A method for operating a first and a second oscillating and/or tumbling screening machine having moving screens and arranged jointly on a floor of a building, moving said screens periodically with the same set frequency, controlling a phase of an oscillation of one screening machine in relation to a phase of an oscillation of a further screening machine is controlled by shifting the phases with respect to one another such that the amplitude of an oscillation of a structural part remains below a predefined maximum value, wherein the structural part is the floor on which the screening machines are arranged, wherein the amplitude and/or the phase of the oscillation of the floor and/or of the screening machines is measured and taken into account when controlling the phases of the oscillation of the screening machines in relation to each other.

6. The method as claimed in claim 5, wherein the amplitude of the oscillation of the floor is measured and, if a predefined limiting value is exceeded, which lies below the maximum value, the phase of the movement of a screening machine is changed.

7. A method for operating a first and a second oscillating and/or tumbling screening machine having moving screens and arranged jointly on a floor of a building, moving said screens periodically with the same set frequency, controlling a phase of an oscillation of one screening machine in relation to a phase of an oscillation of a further screening machine is controlled by shifting the phases with respect to one another such that the amplitude of an oscillation of a structural part remains below a predefined maximum value, wherein the structural part is the floor on which the screening machines are arranged, wherein a phase set point is predefined for each screening machine, and the phase of the oscillation of a screening machine is controlled to the phase set point, the phase set points being chosen such that an oscillation of the floor is minimized.

8. The method as claimed in claim 7, in which the phase in two screening machines is controlled, wherein the phase set point of the first machine is $0(0°)$, and the phase set point of the second machine is $\pi(180°)$, minus a phase difference which results from the propagation time of the oscillation from the second screening machine to the first screening machine.

9. The method as claimed in claim 7, wherein the predefined phase set points are calculated numerically or analytically, the distance of the machines from one another, the arrangement of the screening machines in relation to one another, the oscillation damping of the screening machines, the damping of the floor, the resonant frequencies of the floor and the screening machines, a frequency set point of the movement of the screening machines or of a combination of at least two of these parameters being taken into account.

10. A method for operating a first and a second oscillating and/or tumbling screening machine having moving screens and arranged jointly on a floor of a building, moving said screens periodically with the same set frequency, controlling a phase of an oscillation of one screening machine in relation to a phase of an oscillation of a further screening machine is controlled by shifting the phases with respect to one another such that the amplitude of an oscillation of a structural part remains below a predefined maximum value, wherein the structural part is the floor on which the screening machines are arranged, wherein the control of the movement of the screening machines is carried out while avoiding frequencies which correspond to a resonant frequency of the floor or of a screening machine.

11. The method as claimed in claim 1, wherein between 2 and 36 screening machines are operated simultaneously.

12. The method as claimed in one of claims 1, wherein the method is implemented with the aid of a programmable logic controller.

13. The method as claimed in one of claims 1, wherein polymers, sand, gravel, tea, or herbs or spices are processed with the screening machines.

* * * * *